Figure 1:
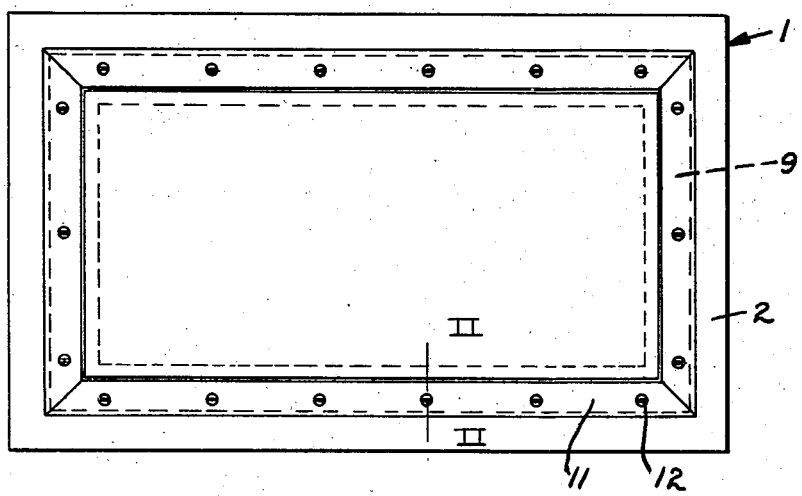

Nov. 3, 1942.   J. W. KAMERER   2,300,506
WINDOW CONSTRUCTION
Filed Nov. 5, 1940

INVENTOR
JAMES W. KAMERER

BY Olew E. Bee
ATTORNEY.

Patented Nov. 3, 1942

2,300,506

UNITED STATES PATENT OFFICE 2,300,506

WINDOW CONSTRUCTION

James W. Kamerer, New Kensington, Pa., assignor to Pittsburgh Plate Glass Company, Allegheny County, Pa., a corporation of Pennsylvania Application November 5, 1940, Serial No. 364,434

2 Claims. (Cl. 189—64)

The present invention relates to glazing structures and more particularly to a window construction in which laminated glass is employed as the glazing medium.

One object of the present invention is the provision of a window construction in which an intermediate air space is sealed from the atmosphere and a metal barrier reinforces the seal to assist in restricting the passage of water vapor therethrough.

Other objects and advantages of the invention will become more apparent from the following detailed description of a preferred embodiment thereof.

Double glazing, which has become of increased importance in building constructions, has been the subject of considerable development. Many forms of double glazed units have been suggested heretofore but in all there has remained unsolved the problem of sealing the unit so as to preclude the admission therein of water vapor. The first forms of insulating windows contained spaced plates of glass having a vitreous edge seal. It was observed, however, that variations in temperature and pressure occasioning the so-called "breathing" action of the unit destroyed the seal and impaired its insulating value. A further development entailed the formation of a unit wherein a resilient sealing medium was employed and provision was made for removing any water vapor which would enter the unit. This could be accomplished by the addition of desiccants or the replacement of moist air by anhydrous air.

The lack of satisfactory sealing media caused a substantial abandonment of the original line of endeavor and there was a trend toward demountable units in which one of the plates of glass could be removed for cleaning and reconditioning the surfaces of the glass plates. In this type of unit there was also provided containers for a dehydrating material in order that the concentration of water vapor could be maintained at a satisfactory minimum.

Briefly stated the present invention contemplates the formation of a sealed window unit employing plates of laminated glass in which the reinforcing interlayer material extends beyond the edges of the glass and serves to secure the laminated plates to a suitable frame. The reinforcing interlayer contains a metallic barrier which will restrict the passage of water vapor therethrough into the enclosed air space of the unit.

Figure 2:
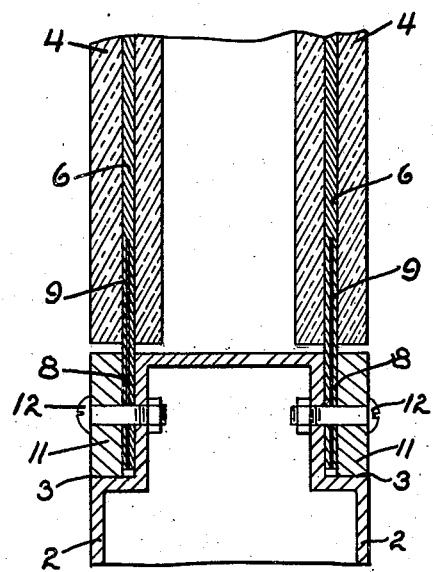

In the drawing:

Fig. 1 is an elevational view of a window construction embodying the principles of my invention; and Fig. 2 is a fragmentary vertical sectional view taken substantially along the line II—II of Fig. 1.

Referring to the drawing, a window construction 1 comprises a frame 2, of metal or wood, provided with rabbets 3 extending around the inner boundary thereof. Plates 4 of laminated glass have a plastic reinforcing interlayer 6 extending beyond the edges of the glass laminae to form borders 8. Ribbons 9 of continuous metal foil are encased within the plastic reinforcing material adjacent the edges thereof and are of sufficient width to project inwardly between the glass laminae. The laminated plates are secured within the rabbets 3 of the frame through the extending reinforcing material by means of plates 11 held to the frame by bolts 12 at spaced intervals therealong.

It will be observed that in the disclosed construction, the space between the laminated plates 4 is substantially sealed from the surrounding atmosphere by clamping the border 8 to the frame 2. The metallic foil 9 encased in the reinforcing material restricts the passage of moisture therethrough and thus increases the effectiveness of the seal. It is, of course, possible that some water vapor might move gradually through the reinforcing material around the metal foil 9, but this path is of such length that the infiltration of water vapor would be exceedingly small.

It will at once be obvious that various modifications in the several elements and their arrangements are possible without departing from the spirit of the invention or the scope of the appended claims.

What I claim is:

1. A window construction comprising a frame, a plurality of plates of laminated glass having a reinforcing interlayer material extending beyond the edges of the glass laminae, means for securing in spaced relation the laminated plates to opposite sides of the frame through the extending reinforcing material, and a metallic barrier encased within the reinforcing interlayer material adjacent its edges to restrict the infiltration of water vapor therethrough into the space between the laminated plates.

2. A window construction comprising a frame, rabbets on opposite sides of the frame extending around the inner boundary thereof, a plurality of plates of laminated glass having a reinforcing interlayer material extending beyond the edges of the glass laminae, a continuous ribbon of metal foil encased in the reinforcing interlayer adjacent the outer edge thereof and of sufficient width to project inwardly between the glass laminae, and means for securing the laminated plates in spaced relation within the rabbets of the frame through the extending reinforcing material.

JAMES W. KAMERER.